United States Patent
Koo

(10) Patent No.: US 11,192,530 B1
(45) Date of Patent: Dec. 7, 2021

(54) PEDAL SIMULATOR

(71) Applicant: HYUNDAI MOBIS CO., LTD., Seoul (KR)

(72) Inventor: Chang Hoe Koo, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/138,458

(22) Filed: Dec. 30, 2020

(30) Foreign Application Priority Data

Oct. 27, 2020 (KR) .......................... 10-2020-0140159

(51) Int. Cl.
  *B60T 7/06* (2006.01)
  *G05G 1/40* (2008.04)
  *G05G 5/03* (2008.04)

(52) U.S. Cl.
  CPC .................. *B60T 7/06* (2013.01); *G05G 1/40* (2013.01); *G05G 5/03* (2013.01)

(58) Field of Classification Search
  CPC ....................................................... G05G 1/40
  See application file for complete search history.

(56) References Cited

U.S. PATENT DOCUMENTS

| | | | | |
|---|---|---|---|---|
| 5,312,172 A | * | 5/1994 | Takeuchi | ................ B60T 7/042 303/113.1 |
| 6,139,119 A | * | 10/2000 | Otomo | .................. B60T 8/3655 303/113.1 |
| 2014/0361473 A1 | * | 12/2014 | Ryu | ........................ B60T 8/409 267/140.2 |
| 2015/0101447 A1 | * | 4/2015 | Kim | ........................ B60T 8/409 74/512 |

* cited by examiner

*Primary Examiner* — Vicky A Johnson
(74) *Attorney, Agent, or Firm* — H.C. Park & Associates, PLC

(57) ABSTRACT

A pedal simulator includes a pedal simulator piston configured to move in a linear direction based on a pedal stroke of a driver, a first stopper that is rotatable in a clockwise or counterclockwise direction and configured to adjust a pedal tactile feedback provided to the driver based on the rotation of the first stopper, a first damper disposed inside the pedal simulator piston to be spaced apart from the first stopper by an air gap, and configured to contract or expand based on the movement in the linear direction, and a second stopper configured to be operatively coupled with the first stopper for causing the air gap to change based on the rotation of the first stopper, wherein the pedal tactile feedback changes based on a change in the air gap.

19 Claims, 3 Drawing Sheets

PEDAL SIMULATOR

CROSS-REFERENCE TO RELATED APPLICATIONS

This application claims priority from and the benefit of Korean Patent Application Number 10-2020-0140159, filed Oct. 27, 2020, the contents of which are incorporated by reference herein in its entirety for all purposes as if fully set forth herein.

BACKGROUND

Field

Embodiments disclosed herein relate to a pedal simulator that can be adjusted to meet a driver's individual preference.

Discussion of the Background

FIG. 5 is a cross-sectional view of a conventional pedal simulator. As shown in FIG. 5, a conventional pedal simulator 500 includes a backup piston 501 which is thrust forward and backward by a vehicle driver's depressing or releasing of a pedal, e.g., a brake pedal, a backup spring 502, a pedal simulator piston 510 linked with the backup spring 502, a spring 512, a first damper 520, and a second damper 530, and a stopper 540.

When the vehicle driver depresses the pedal to advance the backup piston 501 (to the right of FIG. 5), the backup spring 502 is compressed. The compressed backup spring 502 depresses the pedal simulator piston 510. The first damper 520 located inside the pedal simulator piston 510 is compressed by the latter.

Meanwhile, when the pedal simulator piston 510 advances, the spring 512 is depressed and compressed. The pedal simulator piston 510 compresses the second damper 530 coupled to the stopper 540. The pedal simulator piston 510 compresses the second damper 530 and advances until it reaches the stopper 540. The first damper 520 and the second damper 530 establish a reaction force in a direction opposite to the advancement of the pedal simulator piston 510. The driver will have a pedal tactile feedback or pedal feel that is formed based on the reaction force.

However, some drivers prefer a heavy pedal feel, and others prefer it light. The conventional pedal simulator 500 when shipped from the factory is designed with the distance, i.e., an air gap, to be constant between the first damper 520 and the stopper 540, which does not allow the pedal feel to be varied to meet each driver's preference. Therefore, the conventional pedal simulator suffers from the inability to change the pedal feel to meet the driver's preference.

The above information disclosed in this Background section is only for enhancement of understanding of the background of the invention and, therefore, it may contain information that does not constitute prior art.

SUMMARY

Devices constructed according to various implementations/embodiments of the invention are capable of providing a driver the ability to set a pedal feel (e.g., light or heavy or medium) of a pedal simulator to meet that driver's individual preference.

Additional features of the inventive concepts will be set forth in the description which follows, and in part will be apparent from the description, or may be learned by practice of the inventive concepts.

One or more embodiments provide a pedal simulator including a pedal simulator piston configured to move in a linear direction based on a pedal stroke of a driver, a first stopper that is rotatable in a clockwise or counterclockwise direction and configured to adjust a pedal tactile feedback provided to the driver based on the rotation of the first stopper, a first damper disposed inside the pedal simulator piston to be spaced apart from the first stopper by an air gap, and configured to contract or expand based on the movement in the linear direction, and a second stopper configured to be operatively coupled with the first stopper for causing the air gap to change based on the rotation of the first stopper, wherein the pedal tactile feedback changes based on a change in the air gap.

According to at least one other embodiment, a pedal simulator system includes a pedal that is configured to move based on a force provided by a driver. The pedal simulator system also includes a pedal simulator piston configured to move in a linear direction based on movement of the pedal caused by the force applied to the pedal by the driver, a first stopper that is rotatable in a clockwise or counterclockwise direction and configured to adjust a pedal tactile feedback provided to the driver based on the rotation of the first stopper, a first damper disposed inside the pedal simulator piston to be spaced apart from the first stopper by an air gap, and configured to contract or expand based on the movement in the linear direction, and a second stopper configured to be operatively coupled with the first stopper for causing the air gap to change based on the rotation of the first stopper, wherein the pedal tactile feedback changes based on a change in the air gap.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
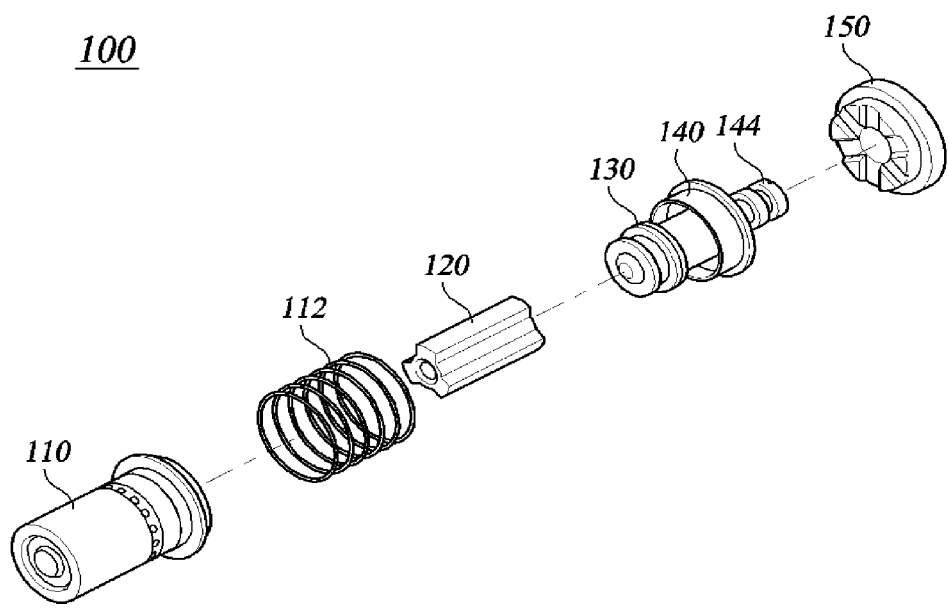
FIG. 1A is an exploded view of a pedal simulator according to at least one embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

According to one or more embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, a display device, and/or one or more components thereof may include or otherwise be associated with one or more memories (not shown) including code (e.g., instructions) configured to cause the display device, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory.

Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this description is thorough, and will fully convey the scope of the invention to those skilled in the art. Like reference numerals in the drawings denote like elements A pedal simulator according to at least one embodiment has a stopper divided into a first stopper and a second stopper The first stopper has a floor surface formed with a rotatable protrusion, and the second stopper is designed to include floor surfaces having different heights that are fitted to the projection of the first stopper. Such a construction allows the driver to rotate the projection for varying the pedal tactile feedback to meet the driver's preference (e.g., light pedal feel, or heavy pedal feel, or something therebetween).

Some embodiments are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto.

Figure 1B:
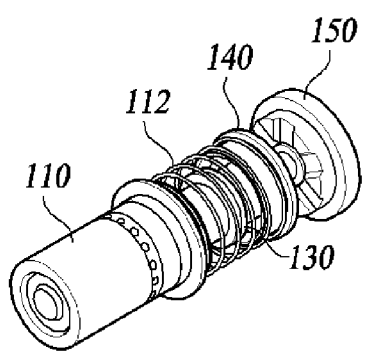
FIG. 1B is a perspective view of the pedal simulator of FIG. 1A as assembled.

FIG. 1A is an exploded view of a pedal simulator according to at least one embodiment, and FIG. 1B is a perspective view of the pedal simulator that is assembled.

As shown in FIGS. 1A and 1B, a pedal simulator 100 according to at least one embodiment includes all or some of a pedal simulator piston 110, a spring 112, a first damper 120, a second damper 130, a first stopper 140, and a second stopper 150.

The pedal simulator piston 110 is linked with a brake pedal (not shown) via a clevis (not shown) that is interlinked with the manipulation of the brake pedal.

The pedal simulator piston 110 moves forward or backward upon receiving the driver's pedal stroke transferred from the clevis. For example, responsive to the driver depressing the brake pedal, the pedal simulator piston 110 primarily advances, which pushes and compresses the spring 112.

The pedal simulator piston 110 is designed to be movable forward or backward in connection with the operation of the brake pedal. Additionally, the pedal simulator piston 110 may be formed in various shapes such that it is movable forward or backward while moving and compressing the first damper 120 in contact therewith.

The first damper 120 is made of an elastic material, for example, rubber, to contract and expand depending on the presence or absence of the depression by the pedal simulator piston 110. Further, according to other embodiments, the elastic material of the first damper 120 may use other materials not limited to rubber, such as silicone, a sponge-like material, or the like.

The first damper 120 is disposed inside the pedal simulator piston 110. More specifically, the first damper 120 has one end disposed to contact the inside of the pedal simulator piston 110, and the other end disposed facing the first stopper 140 to contact one end thereof based on the movement in a linear direction of the pedal simulator piston 110.

Since the first damper 120 is in contact with the inside of the pedal simulator piston 110 at one end thereof, the first damper 120 advances in response to advancement of the pedal simulator piston 110. In response to further advancement of the pedal simulator piston 110, the first damper 120 is in contact with the first stopper 140 and then compressed or expanded by the pedal simulator piston 110.

The first damper 120 depressed and compressed by the pedal simulator piston 110 forms a reaction force in a direction opposite to the direction of the force that the pedal simulator piston 110 applies. For example, when the pedal simulator piston 110 advances, the first damper 120 forms a reaction force while it is compressed.

The second damper 130 is coupled to the first stopper 140. More specifically, the second damper 130 is fitted to the left (i.e., distal) side of the first stopper 140.

When the pedal simulator piston 110 advances, the spring 112 is compressed, and then the other end of the pedal simulator piston 110 contacts the second damper 130. With further advancement of the pedal simulator piston 110, the other end thereof compresses the second damper 130. As with the first damper 120, the second damper 130 forms a reaction force in a direction opposite to the direction of the force that the pedal simulator piston 110 applies. When the pedal simulator piston 110 advances, the second damper 130 forms a reaction force while it is compressed.

The first stopper 140 has one side that faces the pedal simulator piston 110 and the other side that includes a protrusion 142 (shown in FIG. 4) and an adjustment slot lever 144. The protrusion 142 and the adjustment slot lever 144 are coupled to rotate together.

In the pedal simulator according to at least one embodiment, the adjustment slot lever 144 is provided integrally with the protrusion 142 to rotate the protrusion 142 and thereby establish variable engagements with the floor surfaces of the second stopper 150. For example, rotating the adjustment slot lever 144 by 120 degrees in the clockwise direction will cause the protrusion 142 to be rotated by the same 120 degrees in the clockwise direction.

One end of the first stopper 140 is disposed to face the other end of the first damper 120. The first stopper 140 stops the first damper 120 from advancing more than a predetermined distance when the pedal simulator piston 110 advances.

Figure 4:
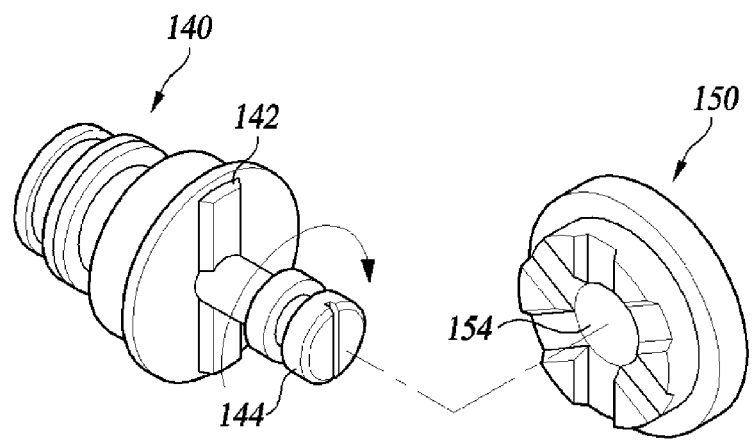
FIG. 4 is a diagram of a first stopper and a second stopper according to at least one embodiment, before assembly.

The second stopper 150 includes a connection hole 154 (shown in FIG. 4). The connection hole 154 is designed to have a predetermined shape, for example, a circular shape, for enabling the adjustment slot lever 144 to be accommodated therein.

Further, the second stopper 150 includes floor surfaces 152a, 152b, and 152c (shown in FIG. 3) having different heights to be coupled with the protrusion 142 of the first stopper 140.

The second stopper 150 is coupled with the first stopper 140. More specifically, the protrusion 142 is fitted into the floor surfaces of the second stopper 150, and the adjustment slot lever 144 is fitted into the connection hole 154 of the second stopper 150.

A rotation of the adjustment slot lever 144, in turn, rotates the first stopper 140 out of engagement with the second stopper 150. In response to the rotation of the first stopper 140, the protrusion 142 moves out of engagement with some portion of the floor surfaces of the second stopper 150 into some other portion of the floor surfaces of the second stopper 150.

The following describes how the pedal simulator as assembled in FIG. 1B is linked with external components, according to at least one embodiment.

According to some embodiments, the pedal simulator is designed to be unitarily coupled to a backup master cylinder (not shown), or it may be designed separately.

The first damper 120 is coupled to the inside of the pedal simulator piston 110. The first damper 120 is coupled to contact the inner left end of the pedal simulator piston 110 to linearly move in unison therewith.

The spring 112 is coupled to the outer right end (distal end) of the pedal simulator piston 110. The spring 112 has one end in contact with the exterior of the pedal simulator piston 110 and the other end in contact with the first stopper 140. One end of the first stopper 140 is inserted into the right end of the pedal simulator piston 110. The first damper 120 and the one end of the first stopper 140 are spaced apart by an air gap 'a' of FIG. 2.

In the pedal simulator according to at least one embodiment, the air gap is a factor that determines the pedal feel of the pedal simulator. For example, when the air gap is large, the driver is provided with a relatively light pedal feel, and when the air gap is small, the driver is provided with a relatively heavy pedal. With the pedal simulator 100 oriented longitudinally in operation, the air gap may increase or decrease based on an elevation at which the first stopper 140 is coupled to the floor surfaces of the second stopper 150. The pedal feel based on the difference in the air gap will be described in more detail with reference to FIG. 4.

The first stopper 140 is coupled with the second damper 130. The second damper 130 is coupled to the outer periphery of the first stopper 140 and contacts the other end of the pedal simulator piston 110 when the same advances. When the pedal simulator piston 110 advances more than a certain distance, the second damper 130 is compressed.

As mentioned above, the other end of the first stopper 140 includes the protrusion 142. The adjustment slot lever 144 is connected to the protrusion 142, in which the protrusion 142 corotates by the angle at which the adjustment slot lever 144 is rotated.

The adjustment slot lever 144 is inserted into the connection hole 154 penetrating the center of the second stopper 150. The height of the connection hole 154 is made shorter than the length of the adjustment slot lever 144. For the adjustment slot lever 144 to be inserted into the second stopper 150 and protrude to the outside, the length of the adjustment slot lever 144 is made longer than the height of the second stopper 150. Accordingly, when the first stopper 140 and the second stopper 150 are intercoupled, the adjustment slot lever 144 passes through the second stopper 150 and protrudes to the outside. The driver can thereby readily adjust the air gap by rotating the adjustment slot lever 144 protruding outward.

The second stopper 150 includes floor surfaces of different heights. The protrusion 142 is fitted to any one of the floor surfaces. As the adjustment slot lever 144 rotates, varying floor surfaces of the second stopper 150 may be fitted with the protrusion 142. As varying floor surfaces are fitted with the protrusion 142, the air gap is adjusted between the first stopper 140 and the first damper 120.

Figure 2:
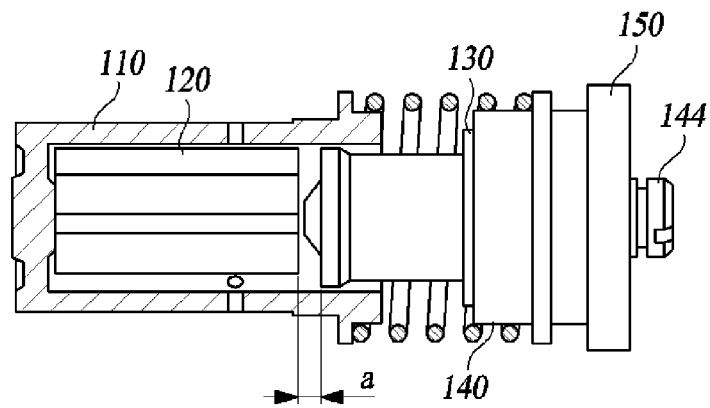
FIG. 2 is a cross-sectional view of a pedal simulator according to at least one embodiment.

FIG. 2 is a cross-sectional view of a pedal simulator according to at least one embodiment.

As shown in FIG. 2, the detailed description refers to the space in FIG. 2 at 'a' as 'air gap' indicated by arrows, and the distance between the arrows represents the size of the air gap. For example, the first stopper 140 when moving to the right increases the gap between the first damper 120 and the first stopper 140 or increases the air gap.

In response to the driver depressing the brake pedal, the pedal simulator piston 110 advances. The first damper 120 inside the pedal simulator piston 110 advances in the direction of the first stopper 140 and is then compressed by the pedal simulator piston 110.

The second damper 130 holds the first stopper 140 from being pushed by applying a reaction force in the opposite direction of the depressing of the pedal simulator piston 110. Here, the pedal tactile feedback to the driver is formed based on the reaction forces formed by the first damper 120 and the second damper 130.

The pedal simulator 100 according to at least one has an air gap that is variable thanks to the first stopper 140 being allowed to move forward or backward (right or left in FIG. 2) based on the heights of the floor surfaces of the second stopper 150.

With the air gap adjusted to be smaller, the driver is provided with a relatively heavy pedal feel, and with the air gap increased, the driver is provided with a relatively light pedal feel. With the air gap decreased, the first damper 120 and the first stopper 140 contact with each other even when the driver relatively slightly depresses the brake pedal. On the other hand, with the air gap increased, the first damper 120 and the first stopper 140 contact with each other only when the driver depresses the brake pedal relatively largely.

Therefore, the pedal simulator 100 according to at least one embodiment may adjust the size of the air gap by moving the first stopper 140 forward or backward, thereby variably adjusting the pedal tactile feedback to the driver.

Figure 5:
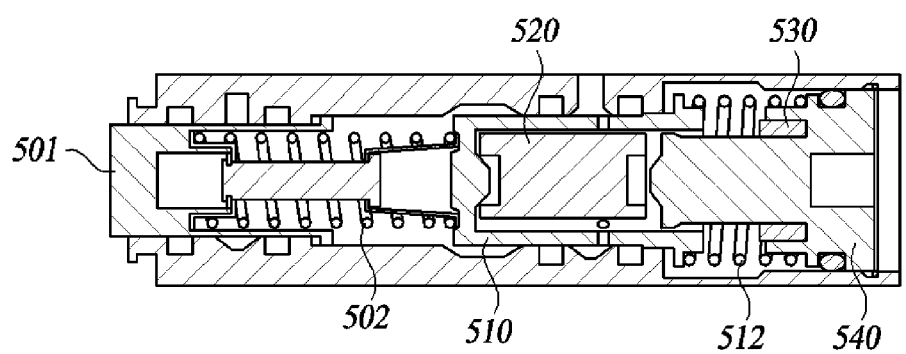
FIG. 5 is a cross-sectional view of a conventional pedal simulator.

In the conventional pedal simulator 500, since the position of the stopper 540 (shown in FIG. 5) is fixed, the air gap is constant. In other words, the pedal feel cannot be adjusted variably. On the other hand, in place of the stopper 540, the pedal simulator 100 according to at least one embodiment provides two separate members of the first stopper 140 and the second stopper 150, wherein the second stopper 150 is provided with the floor surfaces having various heights.

In response to a rotation of the adjustment slot lever 144 of the first stopper 140, the protrusion 142 (shown in FIG. 4) connected to the adjustment slot lever 144 rotates, which renders the protrusion 142 to fit into one of the various heights of the floor surfaces of the second stopper 150.

On a higher floor surface of the second stopper 150, the first stopper 140 is shifted backward (leftward) to reduce the size of the air gap, and thus the driver has a relatively heavy pedal tactile feedback. On the other hand, on a lower floor surface of the second stopper 150, the first stopper 140 is shifted forward (rightward) to increase the size of the air gap, and thus the pedal tactile feedback to the driver is relatively light.

Therefore, the pedal simulator 100 according to at least one embodiment allows the pedal tactile feedback to be adjustable to suit the driver's preference. For example, with the adjustment slot lever 144 rotated clockwise, the pedal feel becomes relatively heavier, and with the adjustment slot lever 144 rotated counterclockwise, the pedal feel is relatively lighter.

Meanwhile, other embodiments may be envisioned, as other configurations may include a pedal simulator wherein a counterclockwise rotation of the adjustment slot lever 144 lightens the pedal feel and a clockwise rotation of the adjustment slot lever 144 brings a heavier pedal feel.

Figure 3:
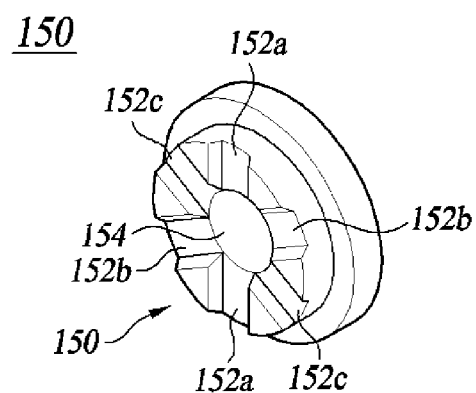
FIG. 3 is a perspective view of a second stopper according to at least one embodiment.

FIG. 3 is a perspective view of a second stopper according to at least one embodiment.

As shown in FIG. 3, the second stopper 150 according to at least one embodiment includes floor surfaces 152a, 152b, and 152c having different heights. Each of the floor surfaces is referred to as a first floor surface 152a, a second floor surface 152b, and a third floor surface 152c. Here, by the heights of the floor surfaces, the first floor surface 152a is the highest and the third floor surface 152c is the lowest.

The floor surfaces are each formed to pass through the center of the connection hole 154. For example, the first floor surface 152a passes through the center of the connection hole 154 as with the second bottom face 152b and the third bottom face 152c. Therefore, across the connection hole 154, each floor surface maintains a constant height to engage the protrusion 142 to be fitted therein.

Additionally, the floor surfaces are each formed symmetrically about the connection hole 154. For example, from the first floor surface 152a, the second floor surface 152b is formed at a position rotated 60 degrees clockwise, and from the second floor surface 152b, the third floor surface 152b is formed at a position rotated 60 degrees clockwise.

Since the second stopper 150 according to at least one embodiment includes three floor surfaces 152a, 152b, and 152c having different heights, different floor surfaces are formed every 60 degrees.

Other embodiments may be envisioned, such as the pedal simulator may include a second stopper that has at least two or more floor surfaces besides the second stopper 150 having the three floor surfaces having different heights. For example, a second embodiment of may include a second stopper having four different floor surfaces, and a third embodiment may include a second stopper having five different floor surfaces.

Any one of the plurality of floor surfaces is fitted to the protrusion 142 attached to the lower end of the first stopper 140.

The pedal simulator in factory default settings has the protrusion 142 fitted to the first floor surface 152a. Thereafter, the driver may change the floor surface into which the protrusion 142 is inserted by rotating the adjustment slot lever 144. For example, when the driver rotates the adjustment slot lever 144 by 60 degrees, the protrusion 142 moves out of engagement from the first floor surface 152a to be fitted into the second floor surface 152b.

Meanwhile, the adjustment slot lever 144 is inserted into the connection hole 154. The connection hole 154 is designed in a predetermined shape, for example, a circular shape in which the adjustment slot lever 144 is rotatably inserted.

Further, the connection hole 154 is preferably designed to have a diameter similar to that of the adjustment slot lever 144 so that they are not separated once assembled. The adjustment slot lever 144 is also contoured to be rotatable once it is inserted into the connection hole 154.

FIG. 4 is a diagram of the first stopper and the second stopper according to at least one embodiment, before assembly.

In FIG. 4, the left side shows the first stopper 140, and the right side shows the second stopper 150. The arrow indicates that the protrusion 142 is adapted to corotate with the adjustment slot lever 144.

The protrusion 142 is formed on the floor surface of the first stopper 140. More specifically, the adjustment slot lever 144 is formed centrally of the other end of the first stopper 140, and the protrusion 142 is formed in a symmetrical shape peripherally at the other end of the first stopper 140.

The protrusion 142 conforms at least partially to the shape of the floor surfaces 152a, 152b, and 152c (FIG. 3) of the second stopper 150 at different heights so that the protrusion 142 may engage one of the floor surfaces.

The adjustment slot lever 144, which is connected to the protrusion 142, is designed in a circular shape so that it can rotate. Further, the adjustment slot lever 144 is formed on a protrusion so that it can be inserted into the second stopper 150.

The first stopper 140 is aligned with the second stopper 150 on their common axis to couple with the second stopper 150. The adjustment slot lever 144 is introduced into the connection hole 154 along the common axis.

The adjustment slot lever 144 conforming to the shape of the connection hole 154 is inserted into the latter and coupled with the second stopper 150. More specifically, the adjustment slot lever 144 is force-fitted to the connection hole 154.

The adjustment slot lever 144 once coupled to the second stopper 150 protrudes to the outside. The protruding adjustment slot lever 144 may rotate clockwise or counterclockwise. In response to the rotation of the adjustment slot lever 144, the protrusion 142 switches its engagement with the second stopper 150 between the different floor surfaces thereof.

Since the floor surfaces of the second stoppers are designed to have different heights, the first stopper 140 may move forward or backward based on the height of the floor surface to which the protrusion 142 is coupled.

With the first stopper 140 designed to move forward or backward, the driver may rotate the adjustment slot lever 144 and thereby change the air gap between the first damper 120 and the first stopper 140.

On the other hand, the floor surfaces 152a, 152b, and 152c of different heights of the second stopper 150 are so shaped as to allow the protrusion 142 to be fitted thereto. For example, where the protrusion 142 has a rectangular shape, the floor surfaces 152a, 152b and 152c having different heights have the conforming rectangular shape. Therefore, when the adjustment slot lever 144 is rotated by a predetermined angle, the protrusion 142 moves out of engagement from one of the floor surfaces of the second stopper 150 and reengages the second stopper 150 at the adjacent floor surface.

When the driver rotates the adjustment slot lever 144 clockwise 60 degrees with the protrusion 142 fitted in the first floor surface 152*a*, the protrusion 142 moves out of engagement from the first floor surface 152*a* and is fitted back in the second floor surface 152*b*. Here, in response to a further 60-degree rotation of the adjustment slot lever 144 in the clockwise direction by the driver, the protrusion 142 moves out of engagement from the second floor surface 152*b* and reengages the third floor surface 152*c*.

On the other hand, when the adjustment slot lever 144 is rotated in a counterclockwise direction, the order of shift in engagement with the floor surfaces is reversed. For example, when the driver rotates the adjustment slot lever 144 counterclockwise 60 degrees with the protrusion 142 fitted in the first floor surface 152*a*, the protrusion 142 moves out of engagement from the first floor surface 152*a* and is fitted back in the third floor surface 152*c*.

Other embodiments may be envisioned, whereas other embodiments may provide the second stopper 150 with four, five, or other numbers of floor surfaces of different heights.

In the second embodiment, the second stopper includes four floor surfaces of different heights (not shown). The floor surfaces of the second embodiment are referred to as a first floor surface, a second floor surface, a third floor surface, and a fourth floor surface, respectively.

Where the second stopper 150 includes four floor surfaces having different heights, the driver may rotate the adjustment slot lever 144 by 45 degrees and thereby switch between the adjacent floor surfaces from one height to another height at which the first stopper engages the second stopper 150.

For example, when the driver rotates the adjustment slot lever 144 by 45 degrees in the clockwise direction with the protrusion fitted in the first floor surface, the protrusion 142 moves out of engagement from the first floor surface and is fitted into the second floor surface. When the driver rotates the adjustment slot lever 144 further 45 degrees in the clockwise direction, the protrusion is separated from the second floor surface and is fitted into the third floor surface. When the driver rotates the adjustment slot lever 144 yet further 45 degrees in the clockwise direction, the protrusion is separated from the third floor surface and is fitted into the fourth floor surface.

On the other hand, as with the first embodiment, the second embodiment also reverses the order in which the floor surface is switched when the adjustment slot lever 144 is rotated counterclockwise. For example, when the driver rotates the adjustment slot lever 144 counterclockwise 45 degrees with the protrusion 142 fitted in the first floor surface, the protrusion 142 moves out of engagement from the first floor surface and engages the fourth floor surface.

In the third embodiment, the second stopper 150 includes five floor surfaces of different heights. With the second stopper 150 including five floor surfaces, the driver may rotate the adjustment slot lever 144 by 36 degrees and thereby change the height of the floor surface to which the first stopper is fitted.

As described above, according to at least one embodiment, the first stopper has the floor surface formed with the rotatable protrusion, and the second stopper is configured to include the floor surfaces having different heights that are fitted to the projection of the first stopper. The driver can then rotate the projection for varying the pedal tactile feedback to the driver's preference.

Although certain embodiments and implementations have been described for illustrative purposes, those skilled in the art will appreciate that various modifications, additions, and substitutions are possible, without departing from the idea and scope of the claimed invention. Therefore, embodiments have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A pedal simulator, comprising:
   a pedal simulator piston configured to move in a linear direction based on a pedal stroke of a driver;
   a first stopper that is rotatable in a clockwise or counterclockwise direction and configured to adjust a pedal tactile feedback provided to the driver based on a rotation of the first stopper;
   a first damper disposed inside the pedal simulator piston to be spaced apart from the first stopper by an air gap, and configured to contract or expand based on a movement in the linear direction;
   a second stopper configured to be operatively coupled with the first stopper for causing the air gap to change based on the rotation of the first stopper;
   a protrusion disposed between the first stopper and the second stopper; and
   an adjustment slot lever configured to rotate the protrusion,
   wherein the pedal tactile feedback changes based on a change in the air gap caused by rotation of the adjustment slot.

2. The pedal simulator of claim 1, wherein the protrusion is configured to be formed on a floor surface of the first stopper; and
   wherein the second stopper comprises:
      floor surfaces having different heights; and
   wherein the second stopper is configured to be coupled to the first stopper so that the floor surfaces are shifted based on a rotation of the adjustment slot.

3. The pedal simulator of claim 2, wherein the air gap is configured to be varied based on which one of the plurality of different heights of the floor surfaces is engaged by the protrusion.

4. The pedal simulator of claim 2, wherein the second stopper includes a connection hole, and
   wherein the adjustment slot lever is inserted into and coupled to the connection hole such that the adjustment slot lever is rotatable in the connection hole.

5. The pedal simulator of claim 2, wherein the air gap is configured to be increased in response to a clockwise rotation of the adjustment slot lever and decreased in response to a counterclockwise rotation of the adjustment slot lever.

6. The pedal simulator of claim 5, wherein the floor surfaces of the second stopper having a plurality of different heights comprise:
   a first floor surface, a second floor surface, and a third floor surface.

7. The pedal simulator of claim 6, wherein
   the first floor surface has a height that is lowest of the floor surfaces having different heights, the second floor surface has a height that is higher than the first floor surface and lower than the third floor surface, and the third floor surface has a height that is greatest among the floor surfaces having the plurality of different heights.

8. The pedal simulator of claim 7, wherein the protrusion of the first stopper is configured:
to move out of engagement from the first floor surface and engage the second floor surface in response to a 60-degree clockwise rotation of the adjustment slot lever,
to move out of engagement from the second floor surface and engage the third floor surface in response to a further 60-degree clockwise rotation of the adjustment slot lever, and
to move out of engagement from the third floor surface and engage the first floor surface back in response to a yet further 60-degree clockwise rotation of the adjustment slot lever.

9. The pedal simulator of claim 2, wherein
the floor surfaces of the second stopper having the plurality of different heights comprise a first floor surface, a second floor surface, a third floor surface, and a fourth floor surface, and
wherein the air gap is configured to be increased in response to a clockwise rotation of the adjustment slot lever and decreased in response to a counterclockwise rotation of the adjustment slot lever.

10. The pedal simulator of claim 9, wherein the protrusion of the first stopper is configured:
to move out of engagement from the first floor surface and engage the second floor surface in response to a 45-degree clockwise rotation of the adjustment slot lever,
to move out of engagement from the second floor surface and engage the third floor surface in response to a further 45-degree clockwise rotation of the adjustment slot lever,
to move out of engagement from the third floor surface and engage the fourth floor surface in response to a yet further 45-degree clockwise rotation of the adjustment slot lever, and
to move out of engagement from the fourth floor surface and engage the first floor surface back in response to a yet further 45-degree clockwise rotation of the adjustment slot lever.

11. The pedal simulator of claim 2, wherein
the floor surfaces of the second stopper having the plurality of different heights comprise a first floor surface, a second floor surface, a third floor surface, a fourth floor surface, and a fifth floor surface, and
wherein the air gap is configured to be increased in response to a clockwise rotation of the adjustment slot lever and decreased in response to a counterclockwise rotation of the adjustment slot lever.

12. The pedal simulator of claim 11, wherein the protrusion of the first stopper is configured:
to move out of engagement from the first floor surface and engage the second floor surface in response to a 36-degree clockwise rotation of the adjustment slot lever,
to move out of engagement from the second floor surface and engage the third floor surface in response to a further 36-degree clockwise rotation of the adjustment slot lever,
to move out of engagement from the third floor surface and engage the fourth floor surface in response to a yet further 36-degree clockwise rotation of the adjustment slot lever,
to move out of engagement from the fourth floor surface and engage the fifth floor surface in response to a yet further 36-degree clockwise rotation of the adjustment slot lever and
to move out of engagement from the fifth floor surface and engage the first floor surface back in response to a yet further 36-degree clockwise rotation of the adjustment slot lever.

13. The pedal simulator of claim 2, wherein the air gap is configured to be increased in response to a counterclockwise rotation of the adjustment slot lever, and to be decreased in response to a clockwise rotation of the adjustment slot lever.

14. The pedal simulator of claim 13, wherein the floor surfaces of the second stopper having the plurality of different heights comprise:
a first floor surface, a second floor surface, and a third floor surface.

15. The pedal simulator of claim 14, wherein
the first floor surface has a height that is highest of the floor surfaces having different heights,
the second floor surface has a height that is lower than the first floor surface and higher than the third floor surface, and
the third floor surface has a height that is lowest among the floor surfaces having the plurality of different heights.

16. The pedal simulator of claim 15, wherein the protrusion of the first stopper is configured
to move out of engagement from the first floor surface and engage the second floor surface in response to a 60-degree clockwise rotation of the adjustment slot lever,
to move out of engagement from the second floor surface and engage the third floor surface in response to a further 60-degree clockwise rotation of the adjustment slot lever, and
to move out of engagement from the third floor surface and engage the first floor surface back in response to a yet further 60-degree clockwise rotation of the adjustment slot lever.

17. The pedal simulator of claim 1, further comprising:
a second damper coupled to the first stopper to face the pedal simulator piston and configured to contract or expand based on the movement in the linear direction.

18. A pedal simulator, comprising:
a pedal simulator piston configured to move in a linear direction based on a pedal stroke of a driver;
a first stopper that is rotatable in a clockwise or counterclockwise direction and configured to adjust a pedal tactile feedback provided to the driver based on a rotation of the first stopper;
a first damper disposed inside the pedal simulator piston to be spaced apart from the first stopper by an air gap, and configured to contract or expand based on a movement in the linear direction;
a second damper coupled to the first stopper to face the pedal simulator piston and configured to contract or expand based on the movement in the linear direction; and
a second stopper configured to be operatively coupled with the first stopper for causing the air gap to change based on the rotation of the first stopper,
wherein the pedal tactile feedback changes based on a change in the air gap, and
wherein the second damper is force-fitted with the first stopper and configured to establish a reaction force against the driver in response to an advancement of the pedal simulator piston and thereby provide the driver with a pedal tactile feedback.

19. A pedal simulator, comprising:
a pedal simulator piston configured to be connected to a pedal and configured to move in a linear direction based on movement of the pedal caused by the force applied to the pedal by a driver;
a first stopper that is rotatable in a clockwise or counter-clockwise direction and configured to adjust a pedal tactile feedback provided to the driver based on a rotation of the first stopper;
a first damper disposed inside the pedal simulator piston to be spaced apart from the first stopper by an air gap, and configured to contract or expand based on the movement in the linear direction;
a spring disposed around the first damper and configured to be compressed when the pedal simulator piston moves in a direction towards the first damper; and
a second stopper configured to be operatively coupled with the first stopper for causing the air gap to change based on the rotation of the first stopper,
wherein the pedal tactile feedback changes based on a change in the air gap,
wherein the first stopper comprises:
a protrusion formed at one end of the first stopper, and
an adjustment slot lever configured to connect with and rotate with the protrusion,
wherein the second stopper comprises:
floor surfaces having a plurality of different heights, and
wherein the second stopper is configured to be coupled to the first stopper so that the floor surfaces are shifted based on a rotation of the adjustment slot lever.

* * * * *